United States Patent [19]
Taylor et al.

[11] Patent Number: 5,652,028
[45] Date of Patent: Jul. 29, 1997

US005652028A

[54] PROCESS FOR PRODUCING CARBIDE PARTICLES DISPERSED IN A MCRALY-BASED COATING

[75] Inventors: Thomas Alan Taylor, Indianapolis; James Kent Knapp, Pittsboro, both of Ind.

[73] Assignee: Praxair S.T. Technology, Inc., Danbury, Conn.

[21] Appl. No.: 629,704

[22] Filed: Apr. 9, 1996

Related U.S. Application Data

[63] Continuation of Ser. No. 264,886, Jun. 24, 1994, abandoned.

[51] Int. Cl.$^6$ ............................................. C23C 4/10
[52] U.S. Cl. .................................... 427/451; 427/450
[58] Field of Search .................................. 427/450, 451

[56] References Cited

U.S. PATENT DOCUMENTS

| | | | |
|---|---|---|---|
| 2,714,563 | 8/1955 | Poorman et al. | 117/105 |
| 2,972,550 | 2/1961 | Pelton | 117/21 |
| 3,993,454 | 11/1976 | Giggins, Jr. et al. | 29/194 |
| 4,092,158 | 5/1978 | Beyer et al. | 75/254 |
| 4,101,713 | 7/1978 | Hirsch et al. | 428/554 |
| 4,585,481 | 4/1986 | Gupta et al. | 106/14.05 |
| 4,999,255 | 3/1991 | Jackson et al. | 428/552 |
| 5,137,422 | 8/1992 | Price et al. | 415/200 |
| 5,141,571 | 8/1992 | DuBois | 148/427 |
| 5,326,645 | 7/1994 | Ashary et al. | 428/552 |
| 5,387,294 | 2/1995 | DuBois | 148/427 |
| 5,407,048 | 4/1995 | Sievers | 192/70.14 |
| 5,424,134 | 6/1995 | Dudel | 428/457 |

*Primary Examiner*—Charles T. Jordan
*Assistant Examiner*—Daniel Jenkins
*Attorney, Agent, or Firm*—Cornelius F. O'Brien

[57] ABSTRACT

A thermal spray process for producing a MCrAlY-based coating wherein M is selected from the group consisting of iron, cobalt, nickel and mixtures thereof and wherein the carbon in the fuel of the thermal spray process converts between 30 to 80 percent by weight of the chromium component in the coating to chromium carbide.

14 Claims, No Drawings

PROCESS FOR PRODUCING CARBIDE PARTICLES DISPERSED IN A MCRALY-BASED COATING

This application is a continuation of prior U.S. application Ser. No. 08/264,886 filing date Jun. 24, 1994, now abandoned.

FIELD OF THE INVENTION

The invention relates to a process for thermal spraying a MCrAlY-based powder composition onto a surface of a substrate using a gaseous fuel-oxygen mixture in which sufficient carbon in the fuel mixture is used to react with one or more elements in the powder to form carbide particles substantially dispersed throughout the coating.

BACKGROUND OF THE INVENTION

There are many good oxidation and corrosion resistant coatings used in industry for various applications and for use in various environments. Articles composed of iron-, cobalt-, or nickel-based superalloys have been developed for use in applications, such as aerospace applications, and for use as blades, vanes, seals and other components utilized in gas turbine engines. In these applications, it is important that the articles have sufficient protection against undue oxidation and sulfidation since such corrosion can affect the useful life of the article resulting in reduced performance and possible safety problems. Although various superalloys have a high degree of corrosion resistance, such resistance decreases when the superalloys are operated in or exposed to high temperature environments.

To increase the useful life of components made of alloys and superalloys, various coatings have been developed. Aluminide coatings were initially used to provide a corrosion resistant outer layer but such layer was observed to crack when subjected to mechanically or thermally induced strain. Another class of coatings developed was the MCrAlY overlay coatings where M represents a transition metal element such as iron, cobalt or nickel. The coatings have been found to be more effective than the aluminide coatings in extending the useful life of alloy components in high temperature environments.

A current problem with conventional MCrAlY coatings on superalloy substrates is interdiffusion of coating elements into the substrate and substrate elements into the coating after long times of high temperature exposure. Certain substrate elements like titanium have been found to diffuse through the MCrAlY coating to the external surface oxide scale and to make said oxide scale less protective. It would be desirable to modify current MCrAlY coatings to reduce this interdiffusion effect.

Although MCrAlY has overall been a successful class of coatings having good oxidation and corrosion resistance for superalloys, improvements have been made to the MCrAlY coatings.

U.S. Pat. No. 3,993,454 discloses coatings which are particularly suited for the protection of nickel and cobalt superalloy articles at elevated temperatures. The protective nature of the coatings is due to the formation of an alumina layer on the surface of the coating which serves to reduce oxidation/corrosion. The coatings contain aluminum, chromium, and one metal chosen from the group consisting of nickel and cobalt or mixtures thereof. The coatings further contain a small controlled percentage of hafnium which serves to greatly improve the adherence and durability of the protective alumina film on the surface of the coating. U.S. Pat. No. 4,585,481 discloses a similar coating except that yttrium and hafnium are used together along with silicon.

It is object of the present invention is to provide thermal spray process for producing a MCrAlY- based coating having a carbide dispersion throughout the coating.

Another object of the present invention to provide a process for producing a MCrAlY-based coating using a detonation gun and wherein the coating has a carbide dispersion throughout.

Another object of the present invention is to provide a MCrAlY-based coating wherein the chromium component is substantially in the elemental chromium form with a minor amount in the chromium carbide form.

SUMMARY OF THE INVENTION

The invention relates to a process for producing a MCrAlY-based coating wherein M is selected from the group consisting of iron, cobalt, nickel and mixtures thereof, which comprises the thermal spraying, such as by detonation gun means, of a MCrAlY-based powder composition onto the surface of a substrate using a gaseous fuel-oxidant mixture comprising an oxidant and at least one combustible gas selected from the group of saturated and unsaturated hydrocarbons in which the atomic ratio of oxygen to carbon is between 1.044 to 1 and 1.00 to 1, preferably between 1.02 to 1 and 1.00 to 1, and most preferably about 1.00 to 1, and the coated layer having between 70 and 100 percent by weight of the carbon component in the form of a carbide, preferably 90 to 100 by weight of the carbon component in the form of a carbide, such as $Cr_{23}C_6$ and/or $Cr_3C_2$. Preferably, the carbon from the fuel-oxidant mixture should be present in the coating in an amount of between 1 and 2.5 weight percent, more preferably about 2 weight percent based on the weight of the coating.

Flame plating by means of detonation using a detonating gun can be used to produce coatings of this invention. Basically, the detonation gun consists of a fluid-cooled barrel having a small inner diameter of about one inch. Generally a mixture of oxygen and acetylene is fed into the gun along with a coating powder. The oxygen-acetylene fuel gas mixture is ignited to produce a detonation wave which travels down the barrel of the gun whereupon the coating material is heated and propelled out of the gun onto an article to be coated. U.S. Pat. No. 2,714,563 discloses a method and apparatus which utilizes detonation waves for flame coating. The disclosure of this U.S. Pat. No. 2,714,563 is incorporated herein by reference as if the disclosure was recited in full text in this specification. In some applications it may be desirable to dilute the oxygen-acetylene fuel mixture with an inert gas such as nitrogen or argon. The gaseous diluent has been found to reduce the flame temperature since it does not participate in the detonation reaction. U.S. Pat. No. 2,972,550 discloses the process of diluting the oxygen-acetylene fuel mixture to enable the detonation-plating process to be used with an increased number of coating compositions and also for new and more widely useful applications based on the coating obtainable. The disclosure of this U.S. Pat. No. 2,972,550 is incorporated herein by reference as if the disclosure was recited in full text in this specification. In other applications, a second combustible gas may be used along with acetylene, such gas preferably being propylene. The use of two combustible gases is disclosed in U.S. Pat. No. 4,902,539 which is incorporated herein by reference as if the disclosure was recited in full text in this specification.

It is desirable to have both elemental chromium and chromium carbide dispersed in the coating since the chromium carbide phase helps to prevent creep at high temperatures and the elemental chromium phase also provides good corrosion resistance characteristics to the coating at elevated temperatures. It is believed that the presence of chromium in the coating has a synergistic type of effect on the aluminum component of the coating in that it increases the affinity of aluminum to react with the oxygen to form $Al_2O_3$ on the surface of the coating so it will effectively stabilize the formation of $A_2O_3$ quickly thus leaving excess elemental aluminum dispersed throughout the coating. The higher addition of carbon in the gaseous fuel can be used to react with the chromium to form chromium carbide while being held insufficient in amount so that elemental chromium will still be present and dispersed throughout the coating. Generally, it is expected that the carbon will combine with chromium to form $Cr_{23}C_6$ and/or $Cr_3C_2$ which may produce useful and beneficial changes in the mechanical properties of the coating. However, in oxidizing or sulfidizing environments, it would generally be better to have some elemental chromium in the coating. Therefore, the amount of chromium carbide and chromium in the coating will depend on the particular application and environment in which the coating will be used. With the higher amount of carbon from the gaseous fuel, a higher percentage of chromium can be used in the powder composition to insure that the proper amount of chromium carbide and elemental chromium is maintained. It is also an option to add other elemental components to the composition which have a higher free energy of formation reaction with carbon so that these elemental carbides could add strengthening characteristics to the coating. Examples of these elements are titanium, tantalum, tungsten, nobium, vanadium and zirconium and generally will be substantially converted to form a carbide, such as 90 or greater percent by weight will be in a carbide phase. It has been observed that these elemental carbides are formed in preference to $Cr_{23}C_6$ and/or $Cr_3C_2$ so that with the additional element added, more of the chromium will remain in the elemental form. By proper adjustment of the components of the powder composition, a coating can be produced that has a desired dispersant of chromium and chromium carbide, and if desired, one or more elemental carbides that could enhance the characteristics of the coating for a particular application. Thus the use of carbon-containing fuels for thermally depositing coatings can be used to produce a class of MCrAlY coatings with intentionally added carbide phases in order to further control the mechanical and other properties of the coating. The metallic starting powders can be used with the carbon from the gaseous fuel to create the amount of and the desired carbide phase in the coating. If desired, additional components can be added to the powder composition to preferentially form carbides of interest and to decrease the conversion of too much of the chromium to form chromium carbide. It is desirable to have at least 30 weight percent, preferably at least 40 weight percent, of the chromium component of the coating in the form of chromium carbide so that additional mechanical strength can be imparted to the coating. At least 25 weight percent of the chromium should remain in the elemental chromium phase so that the coating will have good corrosion resistance characteristics.

A feature of the present invention is that a higher chromium concentration can be used in the MCrAlY-based powder composition since some of the chromium will react with the carbon from the fuel mixture to form a chromium carbide. The carbide phases generated with the gaseous fuel-oxidant mixture and the MCrAlY-based powder composition occurs such that some of the chromium will react with carbon since chromium has the highest free energy of formation of the components so that chromium will be converted to $Cr_{23}C_6$ and/or $Cr_3C_2$. Specifically, at least 30 to 80 percent by weight of chromium shall be converted to chromium carbide and preferably 40 to 70 percent by weight of chromium should be converted to chromium carbide. In accordance with this invention, a higher chromium content in the MCrAlY-based powder composition can be used to compensate for the amount that will form chromium carbide.

The coatings of this invention can be used as a single layer environmental MCrAlY-based coating or as an enhanced bond coat for thermal barrier coatings. The powders for use in this invention are preferably powders made by the vacuum-melted argon-atomization process.

To control the portion of the chromium carbide that will be form in the coating, the atomic ratio of oxygen to carbon in the gaseous fuel-oxidant mixture can be adjusted between 1.044 to 1 and 1.00 to 1. The greater the proportion of carbon in the fuel, the greater the amount of chromium will be converted to chromium carbide.

When using detonation gun techniques, the short period that the powder particles are in the gun chamber may be insufficient to create the desired equilibrium carbide dispersion in the coating and therefore a heat treatment may be advisable to complete the reaction and thereby stabilize the formation of the carbides. The heat treatment could be conducted at 800° C. or above, preferably at 1000° C. or above for a time period to substantially stabilize the formation of the carbides. The time period of the heating step could be from 2 to 10 hours, preferably from 3 to 5 hours.

The MCrAlY powder composition of this invention could have chromium in an amount from 10 to 50 weight percent, preferably from 15 to 40 weight percent and most preferably from 17 to 30 weight percent, aluminum in an amount from 4 to 20 weight percent, preferably from 6 to 18 weight percent and most preferably from 7 to 16 weight percent, yttrium from 0.1 to 1.0 weight percent, preferably from 0.2 to 0.8 weight percent and most preferably from 0.2 to 0.6 weight percent, and balance being iron, cobalt, nickel or mixtures thereof. If desired, other components could be added to the powder composition such as scandium, lanthanum, silicon, hafnium, vanadium, titanium, tantalum, tungsten, niobium, zirconium, ytterbium, cerium and mixtures thereof. The amount of the additional component added would be varied dependent on the purpose of the addition but in most applications an amount between 0.5 to 10, preferably between 1 to 7 based on the weight of the MCrAlY powder composition would be suitable. Examples of suitable powder compositions are shown in the Table 1.

TABLE 1

| COMPO- | Elements - weight percent of Composition | | | | | | |
|---|---|---|---|---|---|---|---|
| SITION | Co | Ni | Cr | Al | Y | Ta | Nb |
| NiCrAlY | — | Bal. | 15–25 | 7–14 | 0.1–1 | | |
| CoCrAlY | Bal. | — | 10–50 | 4–12 | 0.1–1 | | |
| NiCoCrAlY | 10–40 | Bal. | 17–30 | 7–16 | 0.1–1 | | |
| NiCoCrAlYNb | 10–40 | Bal. | 17–30 | 4–16 | 0.1–1 | | 2–8 |
| CoCrAlYTa | 30–83 | — | 10–50 | 4–12 | 0.1–1 | 1–5 | |
| NiCrAlYTa | — | 47–72 | 15–25 | 7–14 | 0.1–1 | 1–5 | |

*Bal - balance by weight

The combustible gas of the gaseous fuel-oxidant mixture for this invention could be at least one gas from the group consisting of acetylene ($C_2H_2$), propylene ($C_3H_6$), methane ($CH_4$), methyl acetylene ($C_3H_4$), propane ($C_3H_8$), ethane ($C_2H_6$), butadienes ($C_4H_6$), butylenes ($C_4H_8$), butanes ($C_4H_{10}$), cyclopropane ($C_3H_6$), propadiene ($C_3H_4$), cyclobutane ($C_4H_6$), and ethylene oxide ($C_2H_8O$). The preferred fuel mixture would comprise acetylene gas alone or mixed with at least one other combustible gas such as propylene.

If desired, an inert gas such as nitrogen could be added to the gaseous fuel mixture in an amount of 20 to 50, preferably 30 to 40 volume percent based on the volume of the combustible fuel and oxygen. Using a detonation gun, the flow rate of the gaseous fuel-oxidant mixture can vary between 10–14, preferably between 11 to 13 cubic feet per minute and the fire rate can vary from 4 to 10, preferably 7 to 9 times per second. The powder feed rate could vary between 5 to 35, preferably between 15 to 25 grams per minute. The parameters would be selected so that the desired amount of carbon would be available to react with the chromium to form the amount of chromium carbide desired in the final coating.

Another method of producing the coating of this invention may be the high velocity oxy-fuel, including the so-called hypersonic flame spray coating processes. In these processes, oxygen and a fuel gas are continuously combusted thereby forming a high velocity gas stream into which the powdered material of the coating composition is injected. The powder particles are heated to near their melting point, accelerated and impinged upon the surface to be coated. Upon impact, the powder particles flow outward forming overlapping thin, lenticular particles and splats. When using the high velocity oxy-fuel technique with a carbon-containing type fuel for depositing the coating, then the oxygen to fuel ratio in cubic feet per hour should be a low oxygen such that the ratio is between 4 to 1 and 1 to 1, preferably between 3 to 1 and 2 to 1. The coating materials of this invention are ideally suited for coating substrates made of materials such as titanium, steel, aluminum, nickel, cobalt, alloys thereof and the like.

EXAMPLE 1

Three coatings were prepared on IN718 substrate pins, heat treated (4 hrs. at 1975° F. in vacuum), finished smooth and peened. Samples of each coating were run in a cyclic oxidation test at 2000° F., where the sample were cycled into the hot zone for 50 minutes, then withdrawn to cool for 10 minutes. After the test the pins were cross-sectioned, mounted in epoxy and polished to reveal the extent of the surface oxide layer and the underlying aluminide depletion layer.

The first two coatings (A and B) were made from the same powder using a detonation gun process with oxygen and propylene gas mixtures in varying proportions to produce different oxygen to carbon ratios. The third coating was a baseline coating for comparison, made using a plasma torch with coaxial argon shielding.

The plasma torch coating was made from a NiCoCrAlY powder of composition given in Table 2. The detonation gun coatings were made with powders having additional aluminum to compensate for the metallic aluminum content that would be converted to aluminum oxide, thus giving about the same residual metallic aluminum as the plasma coating. In addition, the powder for the detonation gun coating had 5.0 wt. percent Nb added in accordance with this invention to actively combine with the carbon coming from the detonation gun process.

The coatings' Vickers microhardness was measured (Table 2). It was found that the detonation gun coatings were about 40 percent harder than the baseline plasma coating. The oxidation test results show the detonation gun coatings have comparable, but slightly less, oxidation resistance than the baseline plasma coatings.

Thus for applications where both high hardness and good oxidation resistance are important, such as in coating a turbine blade z-notch to resist fretting wear or in creep-resisting coating applications for high temperatures, the detonation gun coatings should be superior to the conventional plasma coating since it provides carbon to form a carbide dispersion throughout the coating.

TABLE 2

| *D-Gun Coating | Oxygen Carbon Ratio | Coating Hardness $HV_{.3}$ | Average Outer Aluminide Depletion Plus Oxide Scale Thickness (Mils) 2000° F. | |
|---|---|---|---|---|
| | | | 80 hours | 160 hours |
| A | 1.00:1 | 602 | 0.51 | 0.91 |
| B | 1.03:1 | 586 | 0.53 | 0.81 |
| Plasma | — | 431 | 0.45 | 0.61 |

Starting powder composition for Coating A and B by weight percent: 21.8 Co-16.9 Cr-14.2 Al-0.65 Y-5 Nb-Bal Ni
Starting powder composition for Plasma Coating by weight percent: 21.8 Co-17.2 Cr-12.5 Al-0.6 Y-Bal Ni

EXAMPLE 2

The two detonation gun coatings of Example 1 were chemically analyzed for their oxygen and carbon contents were determined and are shown in Table 3. In addition, two detonation gun coatings with oxygen to carbon ratios as shown in Table 3 were made from a similar composition powder, except there being no niobium addition and these Coatings C and D were likewise chemically analyzed. A baseline plasma torch Coating E was made from a similar but lower aluminum NiCoCrAlY powder and was also chemically analyzed. The amounts of the different phases in the coatings were calculated, based on those chemical analyses. The oxygen was assumed to form the equilibrium highest stability oxides, forming $Y_2O_3$ and then some $Al_2O_3$. The carbon was assumed to form the highest stability carbide first, NbC, then some $Cr_3C_2$. Table 3 summarizes these calculations.

It was found that when Nb is added to the starting powder, the calculation shows the coating to have correspondingly less $Cr_3C_2$ formation and thus more residual metallic chromium. As the oxygen to carbon ratio is increased, the amount of $Al_2O_3$ increase, the amount of $Cr_3C_2$ decreases, and the NbC remains constant for the range of carbon obtained in these coatings (See Coatings A and B).

The amount of residual metallic chromium may thus be controlled by the amount and type of the metallic element M added, where M is a strong MC-type carbide former, and is additionally controlled by the oxygen to carbon ratio of the coating process. Further, the ratio of the dispersed oxide to the dispersed carbide phase is controlled by the oxygen to carbon ratio of the coating process and coatings within the range of 1.00:1 to 1.03:1 were shown in Example 1 to have broadly similar hardness and oxidation resistance. Thus the coating process conditions can be chosen to favor a higher carbide dispersion, depending on the intended application.

It was found that the Nb containing coatings A and B were substantially harder than the baseline plasma coating as shown in Table 2. In addition, the hardness of the coatings without Nb (Coatings C and D) were both found to have a hardness of about 550 $HV_{.3}$. Thus the further effect of Nb is to increase hardness of the coating, which is expected to be beneficial in coating applications where high hardness, creep resistance, or high temperature strength are required. The use of MC carbides, such as NbC, is expected to have greater higher temperature stability against solutioning than $Cr_3C_3$ or lower chromium carbides in the simple NiCoCrAlY detonation-gun coating.

TABLE 3

| Coating | Oxygen:Carbon Ratio | Measured Wt. % | | Calculated Vol. % | | | | Calculated Wt % | |
|---|---|---|---|---|---|---|---|---|---|
| | | Oxygen | Carbon | $Y_2O_3$ | $Al_2O_3$ | NbC | $Cr_3C_2$ | Al | Cr |
| A D-Gun | 1.00:1 | 1.25 | 2.04 | 1.20 | 4.00 | 5.10 | 10.90 | 12.20 | 7.60 |
| B D-Gun | 1.03:1 | 1.55 | 1.45 | 1.20 | 5.20 | 5.10 | 6.30 | 11.70 | 11.60 |
| C D-Gun | 1.00:1 | 1.26 | 1.95 | 1.30 | 4.00 | 0.00 | 15.30 | 11.40 | 3.40 |
| D D-Gun | 1.03:1 | 1.77 | 1.38 | 1.30 | 5.90 | 0.00 | 10.80 | 11.80 | 7.50 |
| E Plasma | — | 0.15 | 0.01 | 1.30 | 0.00 | 0.00 | 0.10 | 12.50 | 17.20 |

*Starting powder compositions for coatings A and B by weight percent: 21.8 Co-16.9 Cr-14.2 Al-.65Y-5.0 Nb-Bal Ni; for C and D, -22.2 Co-17 Cr-14.2 Al -0.7Y - Bal. Ni; and for E: 21.8 Co - 17.2 Cr - 12.5 Al -0.6Y - Bal. Ni.

It is to be understood that modifications and changes to the preferred embodiment of the invention herein shown and described can be made without departing from the spirit and scope of the invention. For example, the coating of this invention could be coated with a top layer of zirconia to produce a good duplex thermal barrier coating.

What is claimed:

1. A process for producing a MCrAlY-based coating wherein M is selected from the group consisting of iron, cobalt, nickel and mixtures thereof, which comprises the thermal spraying by detonation gun means of a MCrAlY-based powder composition onto the surface of a substrate using a gaseous fuel-oxidant mixture comprising an oxidant and at least one combustible gas selected from the group of saturated and unsaturated hydrocarbons in which the atomic ratio of oxygen to carbon is between 1.044 to 1 and 1.00 to 1 and wherein carbon in the gaseous fuel-oxidant mixture in an amount in an amount sufficient to convert between 30 and 80 percent by weight of the chromium component in the coated layer to chromium carbide; and the carbon is present in an amount of at least 1% percent by weight of the coating.

2. The process of claim 1 wherein the atomic ratio of the oxygen to carbon is between 1.02 to 1 and 1.0 to 1.

3. The process of claim 1 wherein between 40 and 80 percent by weight of the chromium component is in the form of chromium carbide.

4. The process of claim 1 wherein the coated substrate is heated to a temperature above 800° C. for a time period sufficient to stabilize the reaction of the carbon from the fuel-oxidant mixture with the chromium in the powder composition to form the desired amount of chromium carbide.

5. The process of claim 1 wherein the at least one combustible gas is selected from the group consisting of acetylene ($C_2H_2$), propylene ($C_3H_6$), methane ($CH_4$), methyl acetylene ($C_3H_4$), propane ($C_3H_8$), ethane ($C_2H_6$), butadienes ($C_4H_6$), butylenes ($C_4H_8$), butanes ($C_4H_{10}$), cyclopropane ($C_3H_6$), propadiene ($C_3H_4$), cyclobutane ($C_4H_8$), and ethylene oxide ($C_2H_8O$).

6. The process of claim 5 wherein the combustible gas is a mixture of acetylene and propylene.

7. The process of claim 1 wherein the MCrAlY-based powder composition further contains at least one of the elements selected from the group of scandium, lanthanum, silicon, hafnium, tantalum, tungsten, titanium, zirconium, cerium, niobium, vanadium and ytterbium.

8. The process of claim 1 wherein the combustible gas is a mixture of acetylene and propylene; the atomic ratio of oxygen to carbon is between 1.02 to 1 and 1.00 to 1; and between 40 and 80 percent by weight of the chromium component in the coating is in the form of chromium carbide.

9. A process for producing a MCrAlY-based coating wherein M is selected from the group consisting of iron, cobalt, nickel and mixtures thereof, which comprises the thermal spraying by high velocity oxy-fuel means of a MCrAlY-based powder composition onto the surface of a substrate using a gaseous fuel-oxidant mixture comprising an oxidant and at least one combustible gas selected from the group of saturated and unsaturated hydrocarbons in which the oxygen to fuel ratio in cubic feet per hour is between 4 to 1 and 1 to 1 wherein the fuel-oxidant mixture converts part of the chromium to chromium carbide during spraying and the coated layer having between 30 and 75 percent by weight of the chromium component in the coating in the form of chromium carbide.

10. The process of claim 9 wherein the oxygen to fuel ratio in cubic feet per hour is between 3 to 1 and 2 to 1.

11. The process of claim 9 wherein between 40 and 80 percent by weight of the chromium component in the coating is in the form of chromium carbide.

12. The process of claim 10 wherein the coated substrate is heated to a temperature above 800° C. for a time period sufficient to stabilize the reaction of the carbon from the fuel-oxidant mixture with the chromium in the powder composition to form the desired amount of chromium carbide.

13. The process of claim 9 wherein the at least one combustible gas is selected from the group consisting of acetylene ($C_2H_2$), propylene ($C_3H_6$), methane ($CH_4$), methyl acetylene ($C_3H_4$), propane ($C_3H_8$), ethane ($C_2H_6$), butadienes ($C_4H_6$), butylenes ($C_4H_8$), butanes ($C_4H_{10}$), cyclopropane ($C_3H_6$), propadiene ($C_3H_4$), cyclobutane ($C_4H_8$), and ethylene oxide ($C_2H_8O$).

14. The process of claim 9 wherein the MCrAlY-based powder composition further contains at least one of the elements selected from the group of scandium, lanthanum, silicon, hafnium, tantalum, zirconium, tungsten, vanadium, cerium, niobium and ytterbium.

* * * * *